(12) United States Patent
Honig et al.

(10) Patent No.: US 11,287,304 B2
(45) Date of Patent: *Mar. 29, 2022

(54) TRUCK SCALE MANAGEMENT SYSTEM AND METHOD

(71) Applicant: TruckPay Inc., Tenafly, NJ (US)

(72) Inventors: Barry Scott Honig, Tenafly, NJ (US); Benjamin Martin Honig, Tenafly, NJ (US)

(73) Assignee: TruckPay Inc., Tenafly, NJ (US)

( * ) Notice: Subject to any disclaimer, the term of this patent is extended or adjusted under 35 U.S.C. 154(b) by 79 days.

This patent is subject to a terminal disclaimer.

(21) Appl. No.: 16/839,768

(22) Filed: Apr. 3, 2020

(65) Prior Publication Data

US 2020/0400487 A1     Dec. 24, 2020

Related U.S. Application Data

(63) Continuation of application No. 16/451,482, filed on Jun. 25, 2019, now Pat. No. 10,634,547.

(60) Provisional application No. 62/862,800, filed on Jun. 18, 2019.

(51) Int. Cl.
| | |
|---|---|
| *G06Q 10/10* | (2012.01) |
| *G06Q 10/06* | (2012.01) |
| *G06Q 30/06* | (2012.01) |
| *G06Q 30/02* | (2012.01) |
| *G01G 19/02* | (2006.01) |
| *G06Q 20/18* | (2012.01) |
| *G06Q 30/00* | (2012.01) |
| *G06Q 50/18* | (2012.01) |

(52) U.S. Cl.
CPC ............ *G01G 19/02* (2013.01); *G06Q 20/18* (2013.01); *G06Q 30/018* (2013.01); *G06Q 30/0281* (2013.01); *G06Q 50/18* (2013.01)

(58) Field of Classification Search
CPC ...... G01G 19/02; G06Q 30/018; G06Q 50/18; G06Q 30/0281; G06Q 20/18
USPC .................................................... 705/1.1–912
See application file for complete search history.

(56) References Cited

U.S. PATENT DOCUMENTS

| | | | | |
|---|---|---|---|---|
| 4,465,151 A | * | 8/1984 | Gorman | G01G 19/022 177/133 |
| 4,605,081 A | * | 8/1986 | Helmly, Jr. | G01G 19/02 177/1 |
| 4,922,339 A | * | 5/1990 | Stout | G08G 1/054 340/937 |

(Continued)

*Primary Examiner* — Jonathan P Ouellette
(74) *Attorney, Agent, or Firm* — Meister Seelig & Fein LLP; Seth H. Ostrow, Esq.

(57) ABSTRACT

A truck scale management system comprising a server including a processor and a memory having executable instructions stored thereon that when executed by the processor cause the processor to connect to a truck scale system through a communication interface via a virtual scale, the virtual scale comprising a data connection to a physical truck scale in the truck scale system and including attributes of the physical truck scale, retrieve a given virtual kiosk associated with the virtual scale from a database, the given virtual kiosk communicatively accessible from a client device and including one or more customizable functionalities and workflows that interact with the truck scale system, and facilitate communication between the client device and the truck scale system via the given virtual kiosk.

26 Claims, 19 Drawing Sheets

(56) References Cited

U.S. PATENT DOCUMENTS

| | | | | |
|---|---|---|---|---|
| 7,432,456 B2* | 10/2008 | LaFollette | ............... | G01G 19/02 |
| | | | | 177/133 |
| 8,686,301 B2* | 4/2014 | Sasser | ..................... | G01G 19/08 |
| | | | | 177/1 |
| 9,830,644 B2* | 11/2017 | Ruud | ..................... | H04W 4/029 |
| 2013/0018705 A1* | 1/2013 | Heath | ................. | G06Q 20/3224 |
| | | | | 705/13 |
| 2018/0120147 A1* | 5/2018 | Hall | ........................ | G01G 19/02 |

\* cited by examiner

Fig. 7B

TRUCK SCALE MANAGEMENT SYSTEM AND METHOD

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

CROSS REFERENCE TO RELATED APPLICATION

This application claims the priority of U.S. Provisional Application No. 62/862,800, entitled "TRUCK SCALE MANAGEMENT SYSTEM AND METHOD," filed on Jun. 18, 2019, the disclosure of which is hereby incorporated by reference in its entirety.

BACKGROUND OF THE INVENTION

Field of the Invention

This application generally relates to electronic scales for weighing of heavy-duty trucks, and in particular, to scales with customizable web-based kiosk interfaces.

Description of the Related Art

Heavy duty truck scales are well known in the art. A truck scale can be used to check individual axle weights and gross vehicle weights to determine whether the vehicle is safe to travel on public roads or bridges without being stopped and fined by the authorities for being overloaded. A truck scale can also be used to check axle weights and gross vehicle weights to determine the weight of a load or amount of good being transported. By weighing the vehicle both empty and when loaded, the load carried by the vehicle can be calculated. Truck scales are used in industries that manufacture or move bulk items, such as in mines or quarries, garbage dumps/recycling centers, bulk liquid and powder movement, household goods, and electrical equipment. Since the weight of the vehicle carrying the goods is known (and can be ascertained quickly if it is not known by weighing the empty vehicle) they are a quick and easy way to measure the flow of bulk goods in and out of different locations.

Kiosk systems may be used with truck scales to manage the flow of trucks in and out of sites, such as a plant or facility. Kiosk devices can either be mounted inside a scale house or outside on a post or pedestal near the truck scale. The kiosk system may facilitate vehicle check-in/out and identification, capturing truck weight, and loading on site. A kiosk may comprise a data collection system that is designed specifically for those sites. As such, these kiosks can integrate with a facility's central office and accounting systems.

However, existing kiosk systems lack ease and versatility for upgrades and features that can be customized without the need of servicing technicians. There is thus a need for a truck scale kiosk system with improved scalability and customization for scale owners and drivers.

SUMMARY OF THE INVENTION

The present invention provides a truck scale management system and method. According to one embodiment, the truck scale management system comprises a server including a processor and a memory having executable instructions stored thereon that when executed by the processor cause the processor to connect to a truck scale system through a communication interface via a virtual scale, the virtual scale comprising a data connection to a physical truck scale in the truck scale system and including attributes of the physical truck scale, retrieve a given virtual kiosk associated with the virtual scale from a database, the given virtual kiosk communicatively accessible from a client device and including one or more customizable functionalities and workflows that interact with the truck scale system, and facilitate communication between the client device and the truck scale system via the given virtual kiosk.

The virtual kiosk may include instructions associated with at least one of: logistics, weighing method, payments, and billing. According to one embodiment, the virtual scale is associated with a plurality of virtual kiosks. In another embodiment, the given virtual kiosk may be associated with a plurality of virtual scales. The processor may further provide a web interface that includes functionality to create and modify the virtual scale and the given virtual kiosk. The processor may further provide access to and rendering of the given virtual kiosk on the client device.

Attributes of the physical truck scale may include at least one of: make and model number, scale type, weighing capability, behavior of the scale, service set identifier, and port number. The processor may further connect to the truck scale system via a service set identifier and a port number. The processor may also further retrieve the given virtual kiosk based on a desired utilization of the truck scale system and authorization given to the client device.

The virtual scale may be associated with a company name and location. The processor may connect to the virtual scale based on the location associated with the virtual scale being nearest to a location of the client device. The processor may also create a geo-fence that specifies a distance that the client device is permitted to be away from to make a valid connection based on the location associated with the virtual scale. The given virtual kiosk includes pages, user interface elements, and billing options that are created manually or selected from pre-created templates. In another embodiment, the given virtual kiosk includes pay-to-weigh and company-owned operating modes. The given virtual kiosk may include tare-then-gross weight, gross-then-tare weight, or gross-weight only weighing methods. The processor may further retrieve a string comprising axle weights of a truck including steer, drive, trailer, and gross weight from the truck scale system in a given multi-port stream according to a user-indicated format.

According to one embodiment, non-transitory computer-readable media comprising program code that when executed by a programmable processor causes execution of a method for managing truck scale systems. The computer-readable media comprising computer program code for connecting to a truck scale system through a communication interface via a virtual scale, the virtual scale comprising a data connection to a physical truck scale in the truck scale system and including attributes of the physical truck scale, computer program code for retrieving a given virtual kiosk associated with the virtual scale from a database, the given virtual kiosk communicatively accessible from a client device and including one or more customizable functionalities and workflows that interact with the truck scale system, and computer program code for facilitating communication between the client device and the truck scale system via the given virtual kiosk.

According to one embodiment, the method comprises connecting to a truck scale system through a communication interface via a virtual scale, the virtual scale comprising a data connection to a physical truck scale in the truck scale system and including attributes of the physical truck scale, retrieving a given virtual kiosk associated with the virtual scale from a database, the given virtual kiosk communicatively accessible from a client device and including one or more customizable functionalities and workflows that interact with the truck scale system, and facilitating communication between the client device and the truck scale system via the given virtual kiosk.

BRIEF DESCRIPTION OF THE DRAWINGS

The invention is illustrated in the figures of the accompanying drawings which are meant to be exemplary and not limiting, in which like references are intended to refer to like or corresponding parts.

DETAILED DESCRIPTION OF THE INVENTION

Figure 1:
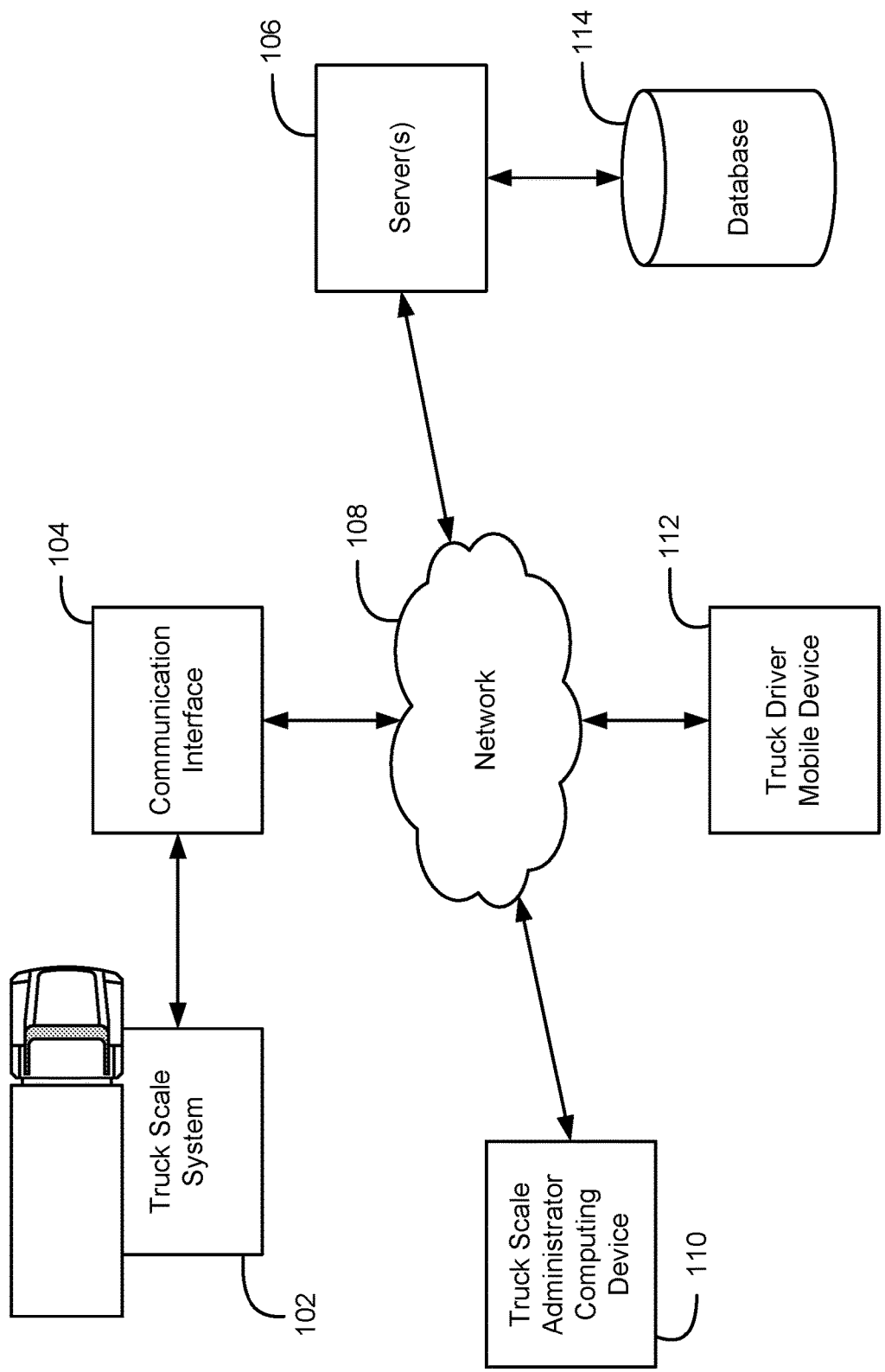
FIG. 1 illustrates a computing system according to an embodiment of the present invention.

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

The present application discloses a truck scale management system that provides web-accessible kiosk interfaces to truck scales. The truck scale management system may include a platform for creating and editing virtual kiosks that associate functionalities and workflow with truck scales. A virtual kiosk may comprise software associated with a scale for logistics, weighing method (e.g., tare then gross weight ("TG"), gross then tare weight ("GT"), or gross weight only ("GO"), reweighment), payments, and billing that can be customized to meet the need of a specific customer by defining entries in specific tables in a database. The platform may allow customers to specify the type of data that they want their software-defined kiosks to collect and how they want to subsequently access that data for further analysis. A given virtual kiosk may be associated with a particular scale. Additionally, multiple virtual kiosks, that perform different functions, may also be connected to the same scale. In another embodiment, multiple scales may be allowed to share the functionality of multiple virtual kiosks.

The platform may include a web interface that provide scale owners with administrative capabilities to create and modify virtual scales and associated kiosks. Scale-owners and trucking companies, as well as drivers, may create accounts and view weighment reports. In one embodiment, client devices such as smart phones may be used by drivers to connect to and interact with scales. A security layer may be established where drivers can login to use particular scales.

The disclosed system may increase flexibility with re-provisioning, adding, or expanding kiosk/scale features. The system's device and location independence enables users to access a kiosk and scale using a web application or browser regardless of their location or what device they use (e.g., PC, mobile phone). As kiosk and scale interfaces are off-site and accessed via a network, such as the Internet, users can connect to the kiosk and scale from anywhere. As such, the presently disclosed system provides flexibility of being able to change the virtual kiosk in real-time and being able to attach any number of virtual kiosks to a given scale at a time.

FIG. 1 illustrates a computing system according to an embodiment of the present invention. The system presented in FIG. 1 includes truck scale system 102, communication interface 104, server(s) 106, network 108, truck scale administrator computing device 110, and truck driver device 112. Truck scale system 102 may comprise structures and devices that are integrated with a weighing apparatus that can measure a weight of a rail or road vehicle and their contents by truck, axle, or load. Exemplary weighting apparatuses of the disclosed system include weighbridges, onboard truck weighing systems, axles scales, and wheel weighing pads. The truck scale system 102 may include electronic components such as a load cell including a transducer that converts an analog signal into a digital weight readout.

The truck scale system 102 may be configured with or connected to a communication interface 104. A truck scale management system comprising server(s) 106 may connect to communication interface 104 to establish communications over network 108. The communication interface 104 may comprise hardware and software including networking components, control systems, sensors, positioning systems, and wired/wireless connections that allow server(s) 106 to communicate with and control the truck scale system 102 in a variety of autonomous, semi-autonomous, or manual modes. The truck scale system 102 operating in an autonomous manner may operate automatically based upon information provided by server(s) 106, without the need for human operator input. Further, the truck scale system 102 operating semi-autonomously may include an operator, either within a vicinity of the truck scale system 102 or remotely, who performs some tasks or provides some input while other tasks are performed automatically based upon instructions provided by the server(s) 106.

Server(s) 106, as described herein, may vary widely in configuration or capabilities but are comprised of at least a special-purpose digital computing device including at least one or more central processing units and memory. The server(s) 106 may also include one or more of mass storage devices, power supplies, wired or wireless network interfaces, input/output interfaces, and operating systems, such as Windows Server, Mac OS X, Unix, Linux, FreeBSD, or the like. In an example embodiment, server(s) 106 may include or have access to memory for storing instructions or applications for the performance of various functions and a corresponding processor for executing stored instructions or applications. For example, the memory may store an instance of the server(s) 106 configured to operate in accordance with the disclosed embodiments.

According to another embodiment, server(s) 106 may comprise cloud computing data centers configured to provide client devices with access to an application, service, or platform. For example, Software-as-a Service ("SaaS") provides the capability to use a provider's applications running on a cloud infrastructure. The applications are accessible from various client devices through a thin client interface such as a web browser or an application. Cloud computing includes a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

Server(s) 106 may connect to truck scale system 102 through communication interface 104 using a virtual scale and communicate operating instructions to the truck scale system 102 based on software-defined kiosk workflow and information stored in database 114. The truck scale management system may include a platform for creating and editing virtual kiosks that associate functionalities and workflow with truck scale system 102. The platform may include a web interface that can be accessed over network 108 to provide administrative capabilities to truck scale administrator computing device 110 to create and modify scales and their associated kiosks. The virtual kiosks may be accessed by and rendered on truck driver mobile device 112 through network 108 to utilize truck scale system 102. For example, a scale owner user (110) may sign on to server(s) 106 via a web portal to create and define a virtual scale. A virtual scale may comprise a software representation of a physical truck scale, specifically, the virtual scale definition describes how the truck scale operates and includes a data connection to the physical scale. A virtual scale can have one or more virtual kiosks connected to it. Truck drivers (112) can connect to a scale's different virtual kiosks, depending upon how they need to use the scale and the types of authorization they have been given.

Network 108 may be any suitable type of network allowing transport of data communications across thereof. The network 108 may couple devices so that communications may be exchanged, such as between servers and client devices or other types of devices, including between wireless devices coupled via a wireless network, for example. A network may also include mass storage, such as network attached storage (NAS), a storage area network (SAN), cloud computing and storage, or other forms of computer or machine readable media, for example. In one embodiment, the network may be the Internet, following known Internet protocols for data communication, or any other communication network, e.g., any local area network (LAN) or wide area network (WAN) connection, cellular network, wire-line type connections, wireless type connections, or any combination thereof. Communications and content stored and/or transmitted to and from devices may be encrypted using, for example, the Advanced Encryption Standard (AES) with a 128, 192, or 256-bit key size, or any other encryption standard known in the art.

Truck scale administrator computing device 110 may comprise computing devices (e.g., desktop computers, laptops, personal digital assistants (PDA), cellular phones, smartphones, tablet computers, or any computing device having a central processing unit and memory unit capable of connecting to a network). Truck driver mobile device 112 may comprise computing devices and vary in terms of capabilities or features, for example, a cell phone, a tablet computer, a laptop, and in-dash car computer, or the like. The truck driver mobile device 112 may comprise a web-enabled client device, which may include one or more physical or virtual keyboards, mass storage, one or more accelerometers, one or more gyroscopes, global positioning system (GPS) or other location identifying type capability, or a display with a high degree of functionality, such as a touch-sensitive color 2D or 3D display.

Figure 2:
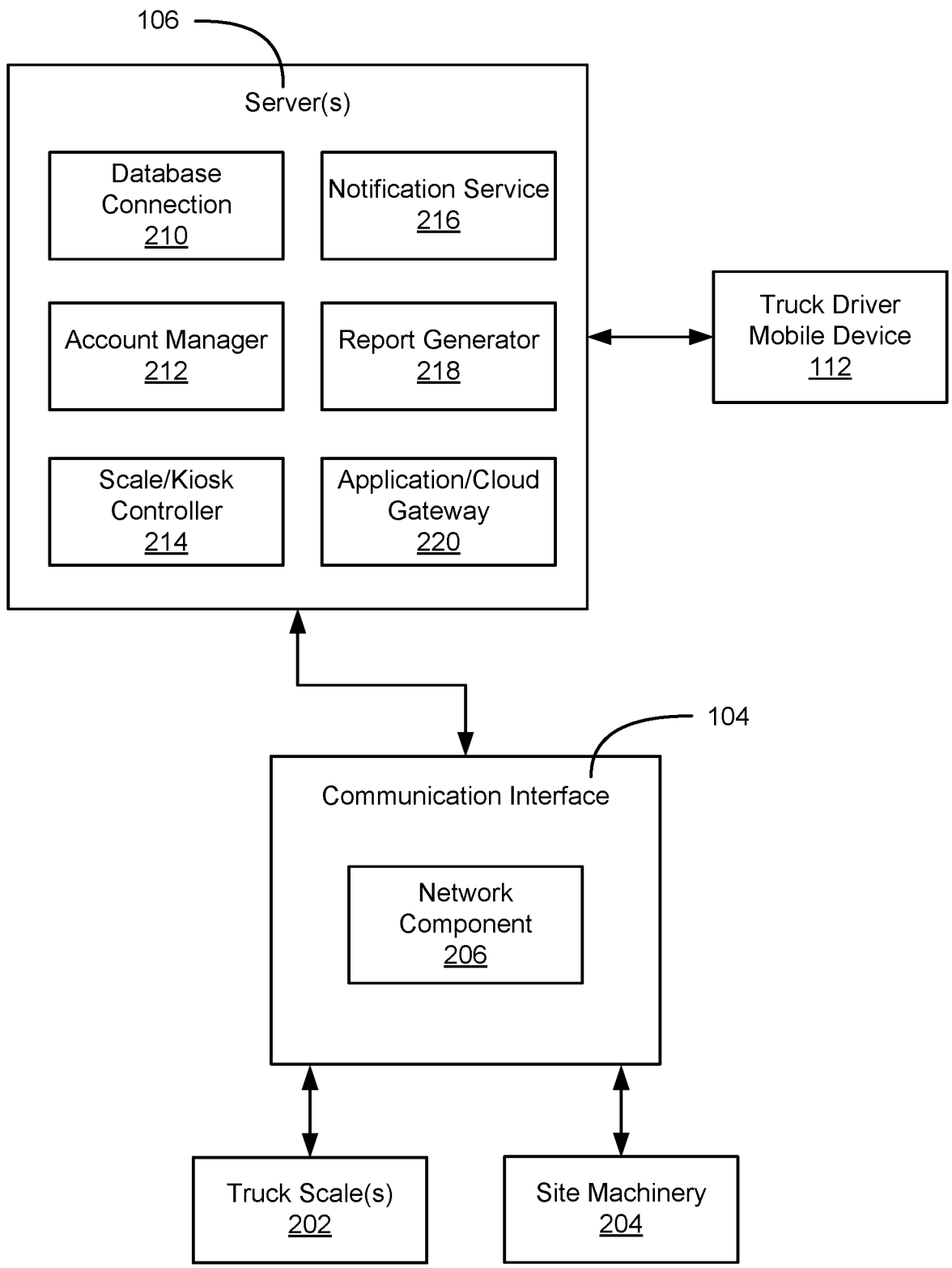
FIG. 2 illustrates a data flow diagram of a truck scale management system according to an embodiment of the present invention.

FIG. 2 presents a data flow diagram of a truck scale management system according to an embodiment of the present invention. A trucking site may include truck scale(s) 202 and site machinery 204. Truck scale(s) 202 may comprise one or more weighing apparatuses for measuring the weight of a truck and/or its load. Site machinery 204 may comprise equipment or hardware that are used in conjunction with truck scale(s) 202 such as automated equipment, sensors, and cameras for loading/unload, scanning, and signaling. Truck scale(s) 202 and/or site machinery 204 may be operable by truck driver mobile device 112 through virtual scale and kiosk interfaces that are provided by server(s) 106.

Server(s) 106 includes database connection 210, account manager 212, scale/kiosk controller 214, notification service 216, report generator 218, and application/cloud gateway 220. A virtual scale and kiosk may be retrieved by truck driver mobile device 112 by logging in or accessing an account with account manager 212. Application/cloud gateway 220 may comprise an intermediary that allows communication between server(s) 106 and truck driver mobile device 112. The application/cloud gateway 220 may provide high-level secure network system communication. For example, when truck driver mobile device 112 requests access to resources of server(s) 106 such as files, Web pages and databases, the truck driver mobile device may first connect with a proxy server, which then establishes a connection with the main server. Account manager 212 may save and load virtual scales and kiosks through database connection 210.

Scale/kiosk controller 214 may define and associate user interface controls with physical features of truck scale(s) 202 and site machinery 204. The scale/kiosk controller 214 may communicate with truck scale(s) 202 and/or site machinery 204 through communication interface 104. Communication interface 104 includes network component 206. The network component 206 may comprise network-related devices (e.g., communication devices, routers (e.g., wireline or wireless routers), switches, etc.). In some implementations, one or more network-related devices of the network component 206 can be connected to or interfaced with truck scale(s) 202 and site machinery 204 to facilitate collecting data (e.g., industrial-automation-system-related data) from the truck scale(s) 202 and site machinery 204 or communicating information (e.g., control signals, parameter data, configuration data, etc.) to the truck scale(s) 202 and site machinery 204.

Account manager 212 may also facilitate billing and payment functions associated with the usage of truck scale(s) 202. Report generator 218 may generate reports of activity, billings, payments, maintenance, and errors. Notification service 216 may generate alerts or messages to truck driver mobile device 112 and truck scale administrator computing device to report tickets, invoices, confirmations, reminders, warnings, and other system reports.

Figure 3:
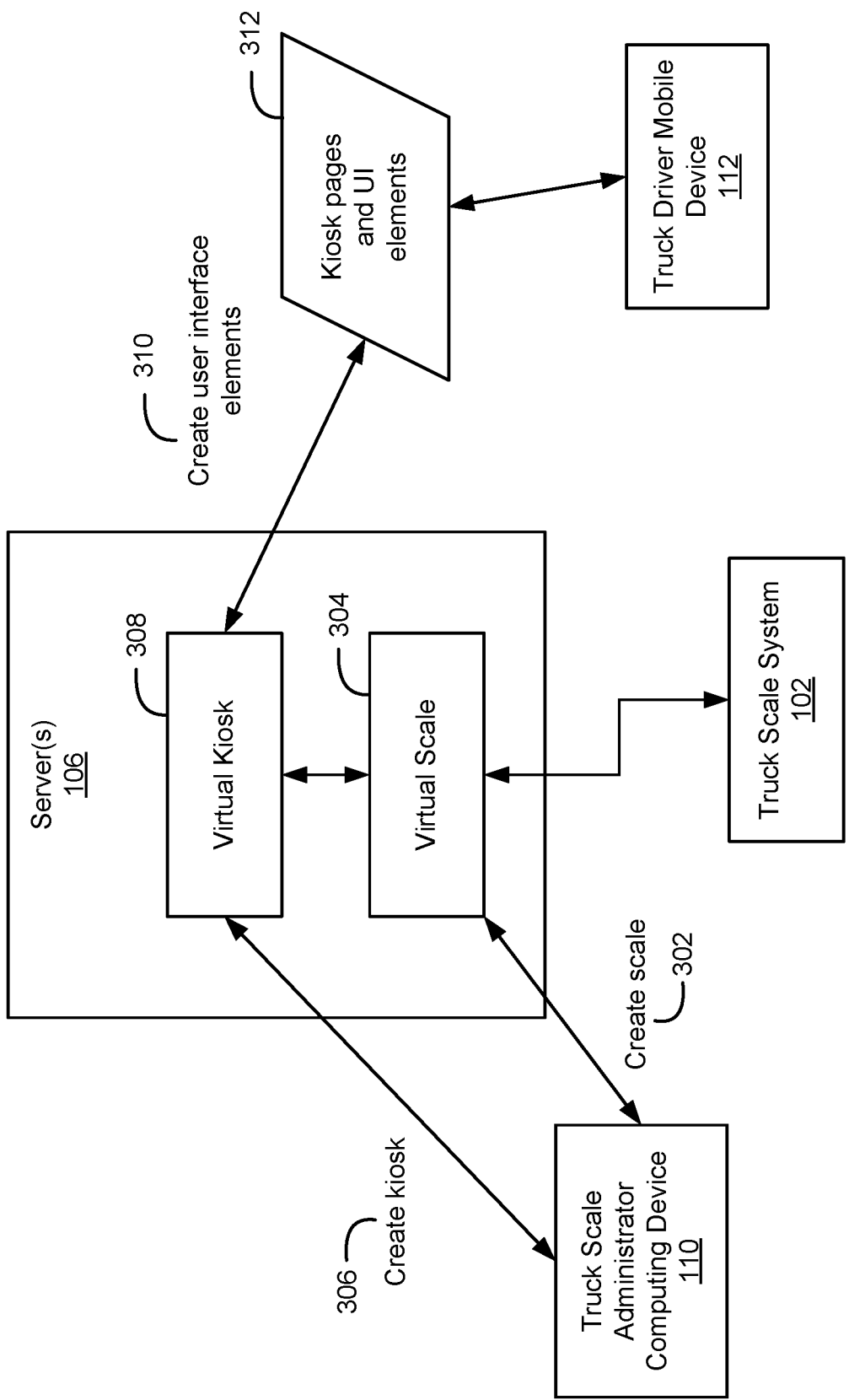
FIG. 3 presents a data flow diagram of a truck scale management system according to an embodiment of the present invention.

FIG. 3 presents a data flow diagram of a truck scale management system according to an embodiment of the present invention. A web interface may be provided by a truck scale management system on server(s) 106 for scale owners to create virtual scales and kiosks associated with the virtual scales. A truck scale administrator computing device 110 may access the truck scale management system to initialize a process (302) for creating a virtual scale 304. Virtual scale 304 may comprise a representation of a physical scale at truck scale system 102 that is defined with certain attributes. Attributes of virtual scale 304 may comprise hardware specifications of the scale including make and model number, scale type, weighing capability, behavior of the scale, a service set identifier (SSID), and a port number. In one embodiment, an administrative user may add scale definitions to a database table of the system where users may be able to select from when creating their own user defined scales.

Virtual scale 304 may also be associated with a company, for example, by linking the virtual scale to a name and location of the company. The location may include data that contains the latitude and longitude of the scale's location. For example, truck driver mobile device 112 using truck scale management system to weigh a truck may be presented with a scale having a location nearest to a current location of truck driver mobile device 112. The virtual scale 304 may also include a special code that an owner of the scale can specify to differentiate scales when multiple scales are present on a site. The special code can also be used to locate a scale, if for example, location services on truck driver mobile device 112 is not available.

According to one embodiment, the location data of the scale may be used to create a geo-fence that specifies a distance that the truck driver mobile device 112 can be away from the scale in order to make a valid connection. A pre-configured or user-specified distance and units of distance may be used to set the geo-fence. The default distance units may be configured for the country where the scale is located. If truck driver mobile device 112 is within the geo-fence of a scale, the truck driver mobile device 112 may attempt to connect to the scale and notify of a successful connection to the scale. The virtual scale 304 may also be configured with a weighmaster option that indicates that a driver needs to call the weighmaster at the scale-house to perform the weighment or to provide a personal identifier number (PIN) or code for a driver to connect to the virtual scale 304.

The truck scale administrator computing device 110 may further initialize a process (306) to create virtual kiosk 308 using the truck scale management system. Virtual kiosk 308 may include a workflow for display on a truck driver mobile device 112. The create kiosk 306 process may include defining attributes of the virtual kiosk 308, such as pages, user interface (UI) elements, and billing options. Virtual kiosk 308 may be created manually or selected from pre-created templates.

Virtual kiosk 308 may be configured with "pay-to-weigh" and "company-owned" operating modes. A pay-to-weigh mode may allow scale-owners to charge drivers for each weighment, whereas the company-owned mode may not charge drivers. Weighing methods may also be configured for "tare-then-gross weight," or "gross-then-tare weight," or "gross-weight only." Weight units may also be specified to indicate units to be used for weighment, for example, tons, pounds, kilograms, and metric-tons. A starting ticket value may be configured for generating custom ticket numbering sequences. The type of billing may also be configured for pay-to-weigh operation including billing to a customer's account or requesting a PIN associated with an account be specified, or billing to a credit card.

According to one embodiment, a scale-owner may configure virtual kiosk 308 to provide discounts for reweighments, where the cost for reweighment is less than an initial weighment cost within a maximum amount of time that can elapse between the initial weighment and the reweighment in order to receive the discounted price. Changes in reweighment cost and time may also be tracked for future analysis. A special prefix may be assigned to reweighment tickets.

Truck driver mobile device 112 may be used by truck drivers to connect to and interact with truck scale system 102 through virtual scale 304 and virtual kiosk 308. Truck driver mobile device 112 may connect to truck scale system 102 via virtual scale 304. Virtual scale 304 may include a SSID and a port number that a Transmission Control Protocol/Internet Protocol (TCP/IP) connection can be made to connect with truck scale system 102. A location specified by a truck driver user or as determined by truck driver mobile device 112 may be provided to virtual kiosk 308 to verify a correct virtual scale 304 to connect to. Virtual kiosk 308 may comprise an interface with virtual scale 304 that allows inter-process communications of data from a physical scale at truck scale system 102. Server(s) 106 may create (310) kiosk pages and user interface elements 312 for rendering on a screen of truck driver mobile device 112 as defined by virtual kiosk 308. Kiosk pages and user interface elements 312 may include custom text fields, button, drop-down selectors for inputs that have a set of options to choose from.

Figure 4:
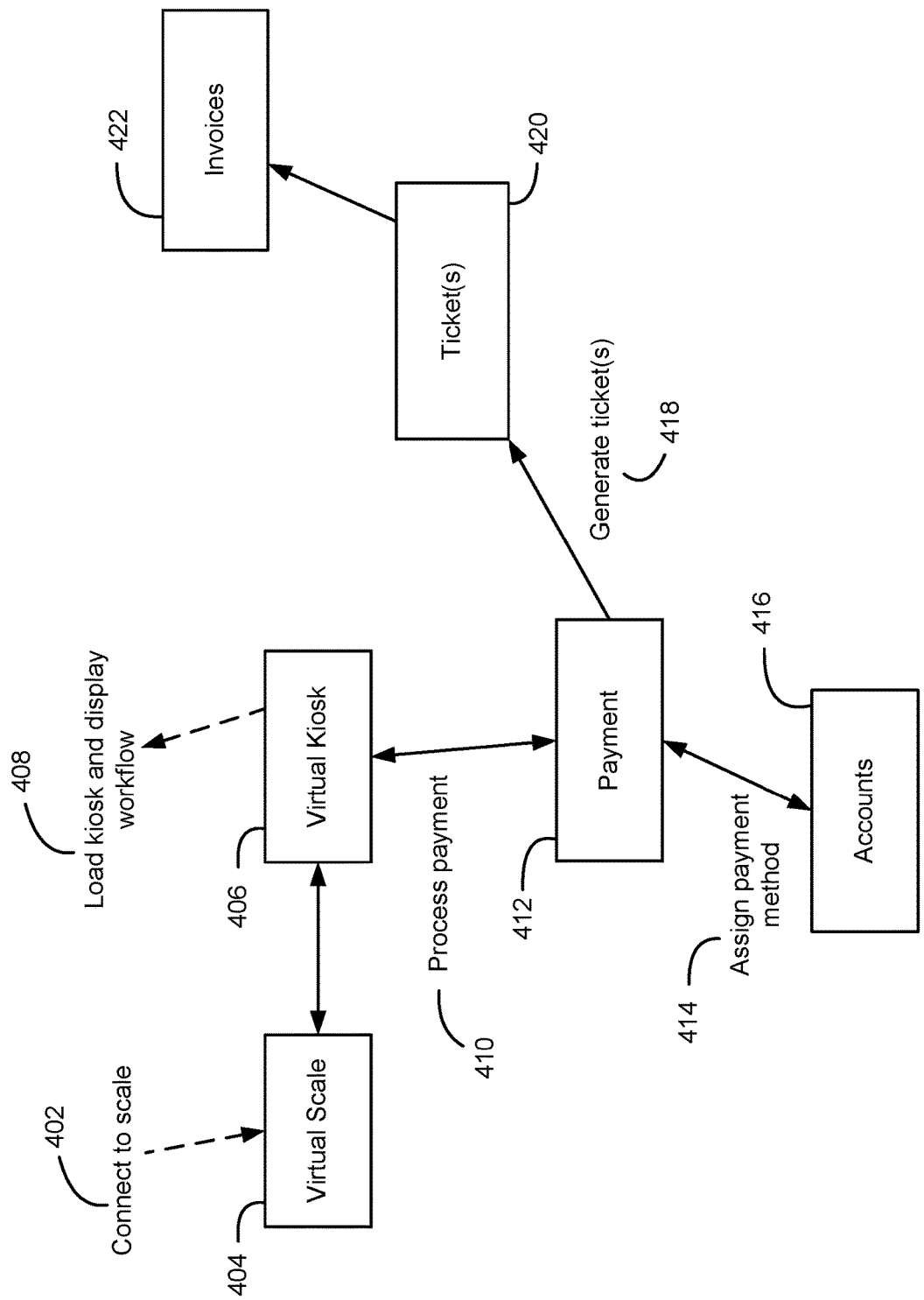
FIG. 4 presents another data flow diagram of a truck scale management system according to an embodiment of the present invention.

FIG. 4 presents a data flow diagram of a truck scale management system according to an embodiment of the present invention. A user from a device (such as truck driver mobile device 112) may connect to virtual scale 404 through via a TCP/IP connection (402). The virtual scale 404 may be automatically selected for a truck driver user on their device based coordinates or location code. For example, truck driver mobile device 112 may include a location services feature that can detect the location of the device using location data, such as GPS. A virtual kiosk 406 may be connected to or associated with virtual scale 404 and automatically downloaded to the truck driver device to display workflow on the device (408).

Payments may be solicited where they are processed (410) by payment 412. Users may pay by methods such as credit card/debit or company account and/or account pin. Selected payment methods are assigned (414) to accounts

416. Scale owners may create accounts for trucker users or owner operators. Accounts optionally have PINs for increased security and may be restricted to specific kiosks.

After payment is processed, ticket(s) are generated (418) and may be stored in a database. Ticket(s) 420 may comprise a digital ticket that is generated based on data from the scale and any information generated from virtual kiosk 406. Data on ticket(s) 420 may be displayed via the virtual. Invoices can be generated (422) when ticket(s) 420 are created.

Figure 5:
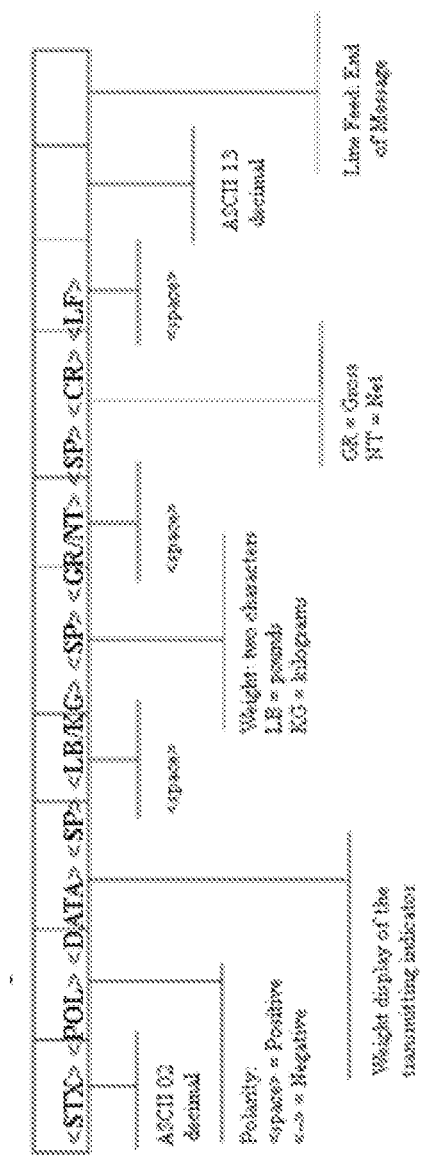
FIG. 5 illustrates an exemplary data string format according to an embodiment of the present invention.

The disclosed system may also include an instrumentation protocol for transmitting axle weights from a physical scale device to a mobile computing device or any other type of computer. Users, through a user interface, may specify multiple types of string formats that provide the axle weights and associated data, to the truck scale management system platform or any other scale management system. String formats may be specified in a serial data format may be used to interface with such computing devices. FIG. 5 presents an exemplary data string format that may be selected for generating output data from a scale. The serial data may be transmitted in an ASCII-compatible format.

Figure 6:
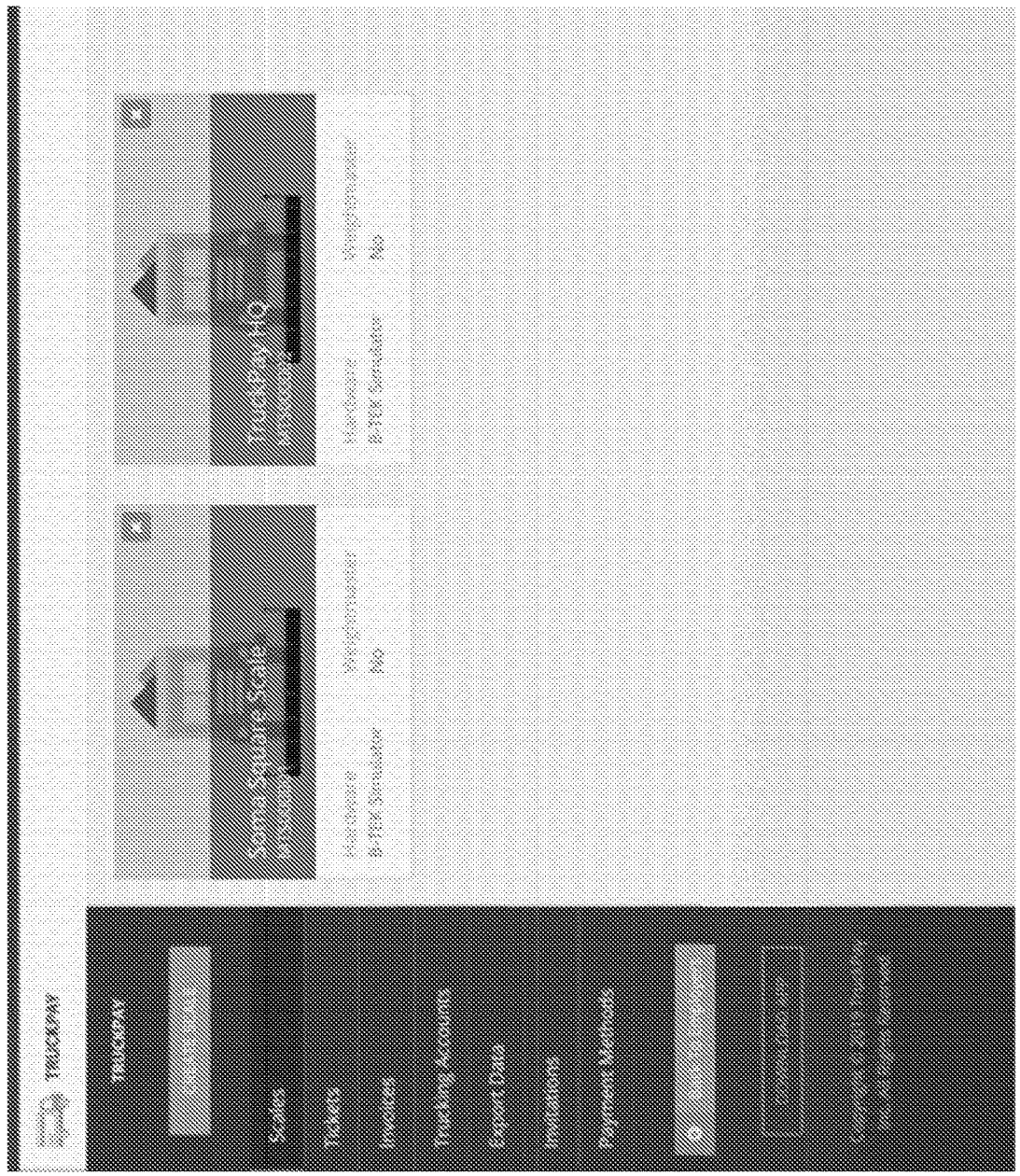
FIGS. 6-15 illustrate exemplary screen interfaces for configuring virtual scales and kiosks in a truck scale management system according to an embodiment of the present invention.
Figure 7A:
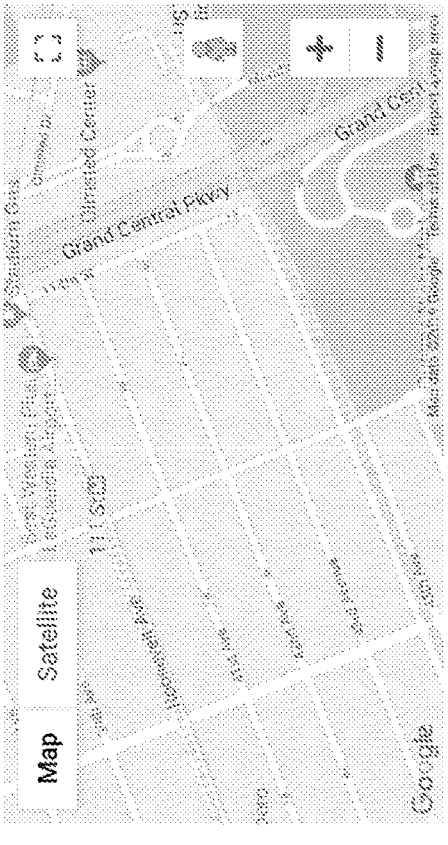

Users may create and define virtual scales by, for example, signing on to a web portal of a truck scale management system. A virtual scale may comprise a software representation of a physical truck scale, specifically, the virtual scale definition describes how the truck scale operates. FIG. 6 presents an exemplary screen for managing scales that are owned or managed by an administrative user under an account according to one embodiment of the present invention. The user may create, remove, edit, and view virtual scales. Virtual scales may comprise a digital analog corresponding to a physical scale. A pop-up interface may be provided to add a new scale as illustrated in FIG. 7A. The user may input information for creating the scale, such as scale hardware, a scale nickname, SSID, port number, location code and information (including latitude and longitude, and/or scale address), and a weighmaster requirement option.

Figure 7B:
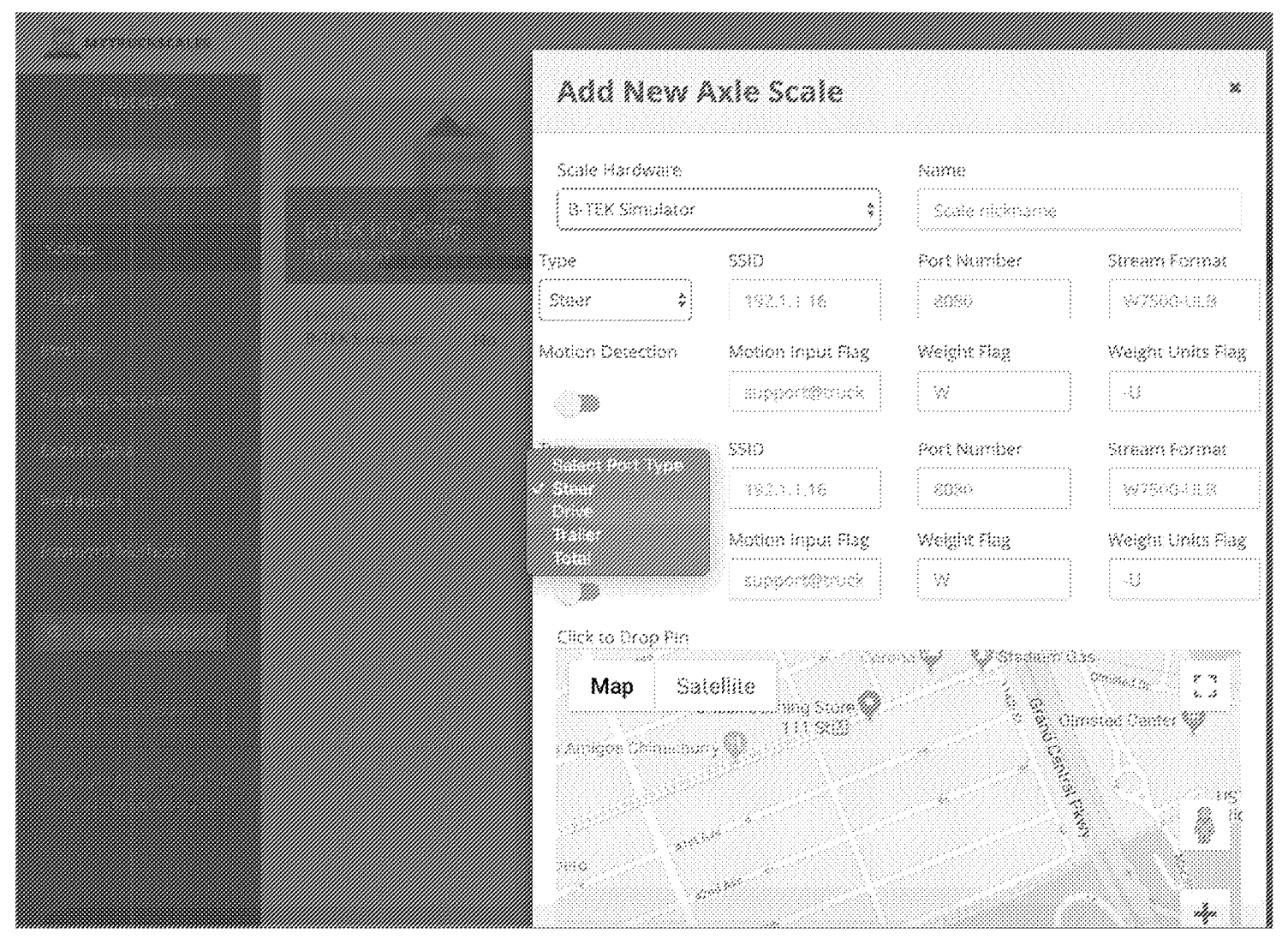

FIG. 7B presents an exemplary interface for providing axle weights according to another embodiment of the present invention. If a scale device has axle weighing capability, a multi-port stream representation may be configured as a default stream transmitted. The virtual scale may override this default and to specify exact ports over which different axle strings, containing different axle weights, can be sent. The format of the string/streams that the scale device transmits can be customized by the scale-owner to accommodate their own specific needs. By providing a user interface to graphically describe the format of the string(s) makes it easier for the user to specify how to electronically communicate with an axle weighing scale.

Axle weights may comprise a steer weight, drive weight, and a trailer weight. Alternatively, the scale device may also provide a data stream with the sum of these three weights, also known as the total weight. A weight sum is not required to be specified, as this value may be calculated from the other three weights. The user will therefore be able to indicate how many data streams will be sent by the scale device and over which ports. Specifically, the user may enter the number of ports, the port numbers, and which of the steer, drive, trailer, and total weight streams are specified on which port(s). The user interface may then allow the user to indicate the format of the string(s) by typing it in or selecting from a list and graphically indicating where the steer weight, drive weight, and trailer weight, and possibly total weight are in the string.

For multiple ports, the user may indicate the format of the particular string sent over the specified port. The user may also indicate where a motion flag, if one exists, and where the weight units are located within each string. If there are separate multiple ports, then the user may indicate which weight string, e.g., steer or drive or trailer weight, is sent over which port. The user can also indicate if a total weight is sent and over which port. The user indicate which parts of the string corresponds to weight, weight units, and motion flag.

An application programming interface (API) may obtain and save these strings and annotate them with appropriate delimiters so that they can be matched against a regular expression that describes how the string(s) are to be parsed. The system may parse the user-indicated format of the string and ask the user to confirm that each value is correct. If the values are not correct, then the user may be shown the problematic part of the string and be given an opportunity to fix it. After fixing the string, the user can have the system try to parse string again. Once a string representation has been successfully parsed and saved, an API may be able to retrieve it, so that users or administrators can modify it. The user may take the result of the API and display it, for example, on the web, so that the user can see which parts of the string(s) represents the steer, drive, trailer weight, and the other parts of the string(s) that were originally saved.

Figure 8:
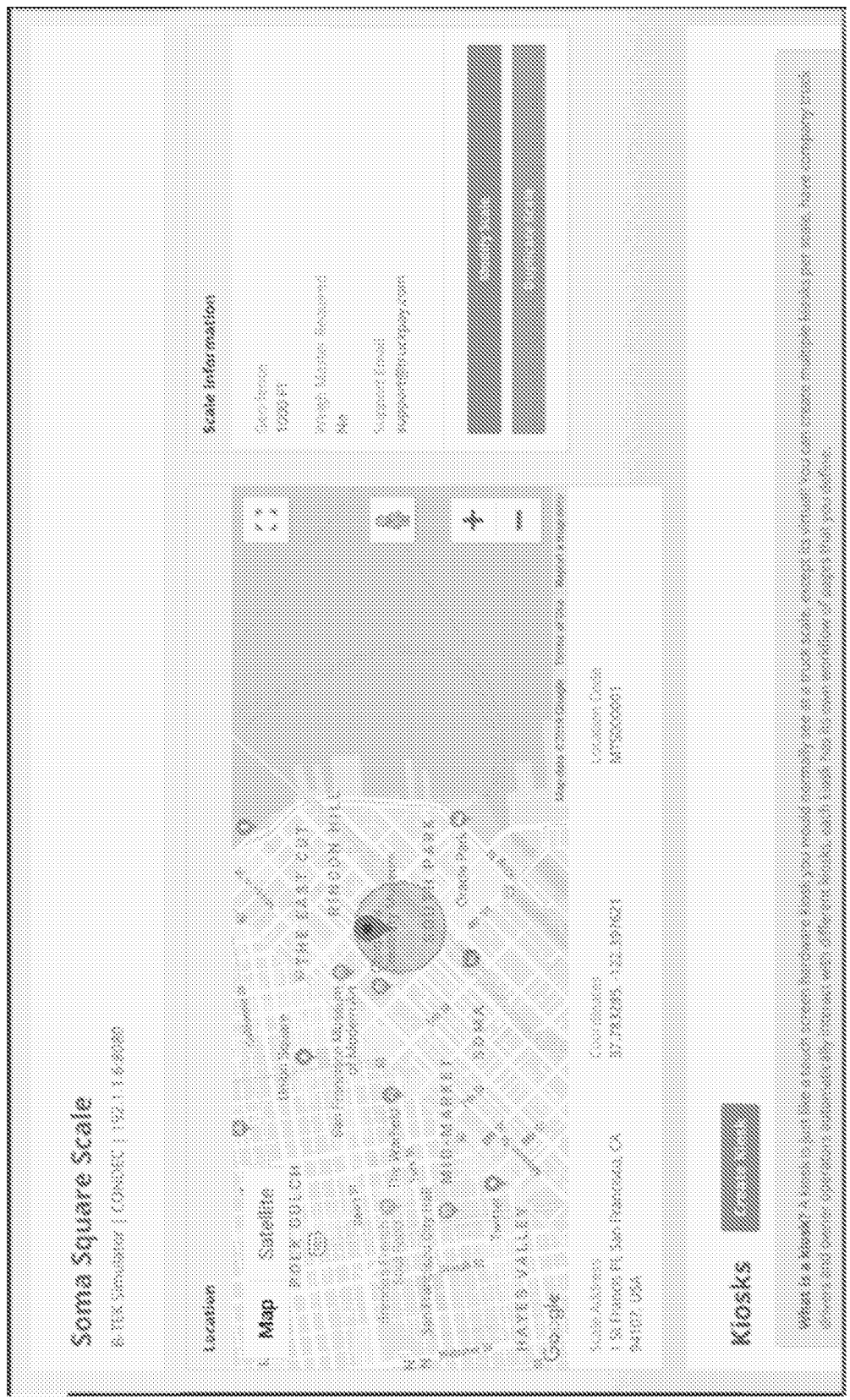

Any one of created virtual scales may be selected for viewing of scale information and details. The exemplary illustration of FIG. 8 presents a scale view of a given one of existing virtual scales in the account. The scale view may display information that was provided in creating the virtual scale. The scale view may also allow the user to modify the scale (information) or duplicate the virtual scale to create another scale entry.

Figure 9:
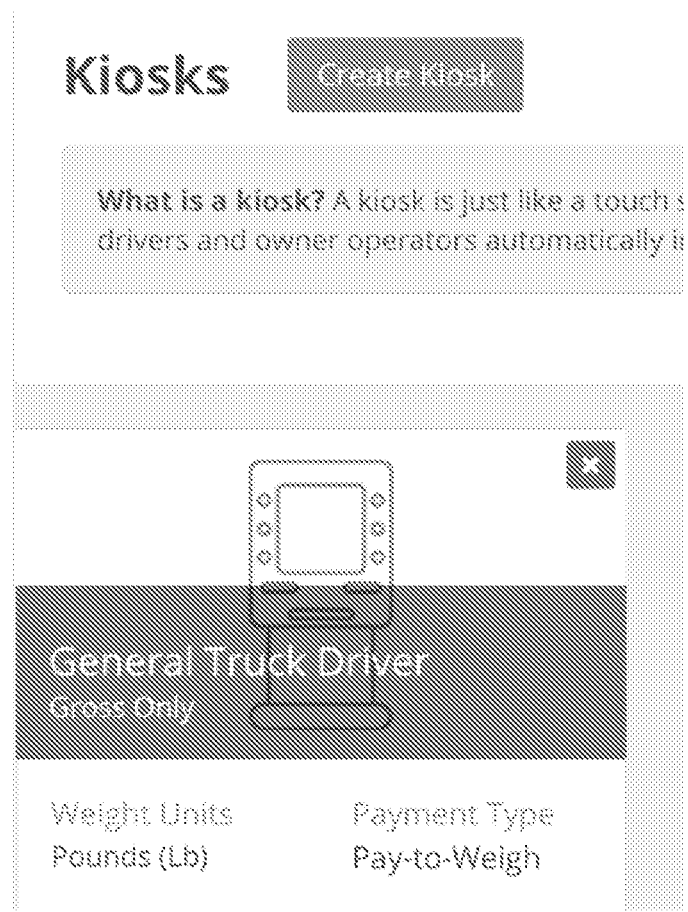

A virtual scale can have one or more virtual kiosks connected to it. The scale view may include an option to view, create, and remove kiosks for the virtual scale, as provided in the illustration of FIG. 9. A virtual kiosk may be created to electronically document the use of a scale, for example, to accept credit card payments or account billing for pay to weigh scales. A virtual kiosk may also be configured to record items such as truck and trailer IDs as well as the material being weighed. Multiple kiosks may be created for a scale. Truck driver users may connect to a scale's different virtual kiosks, depending upon how they need to use the scale and the types of authorization they have been given.

Figure 10:
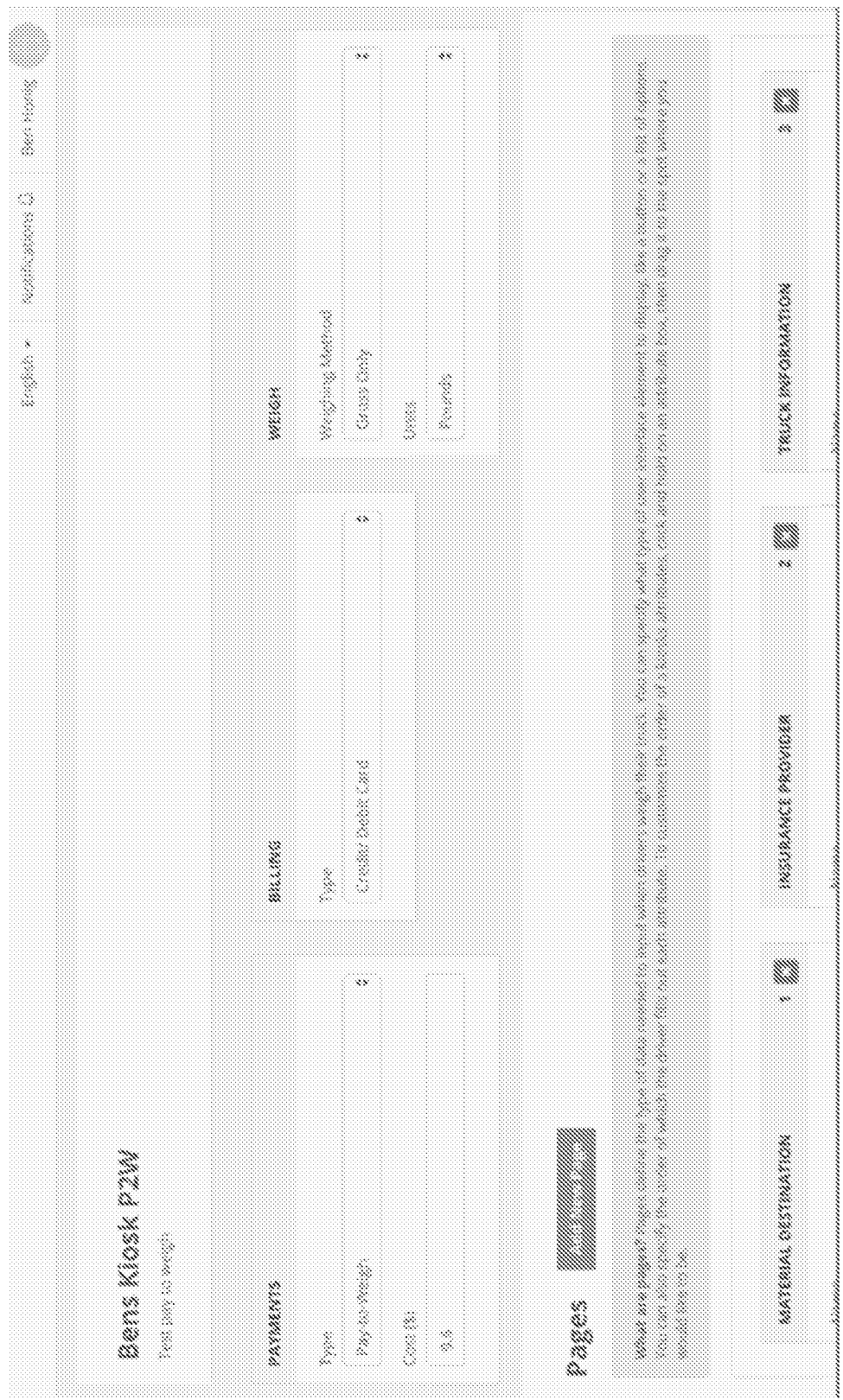
Figure 11:
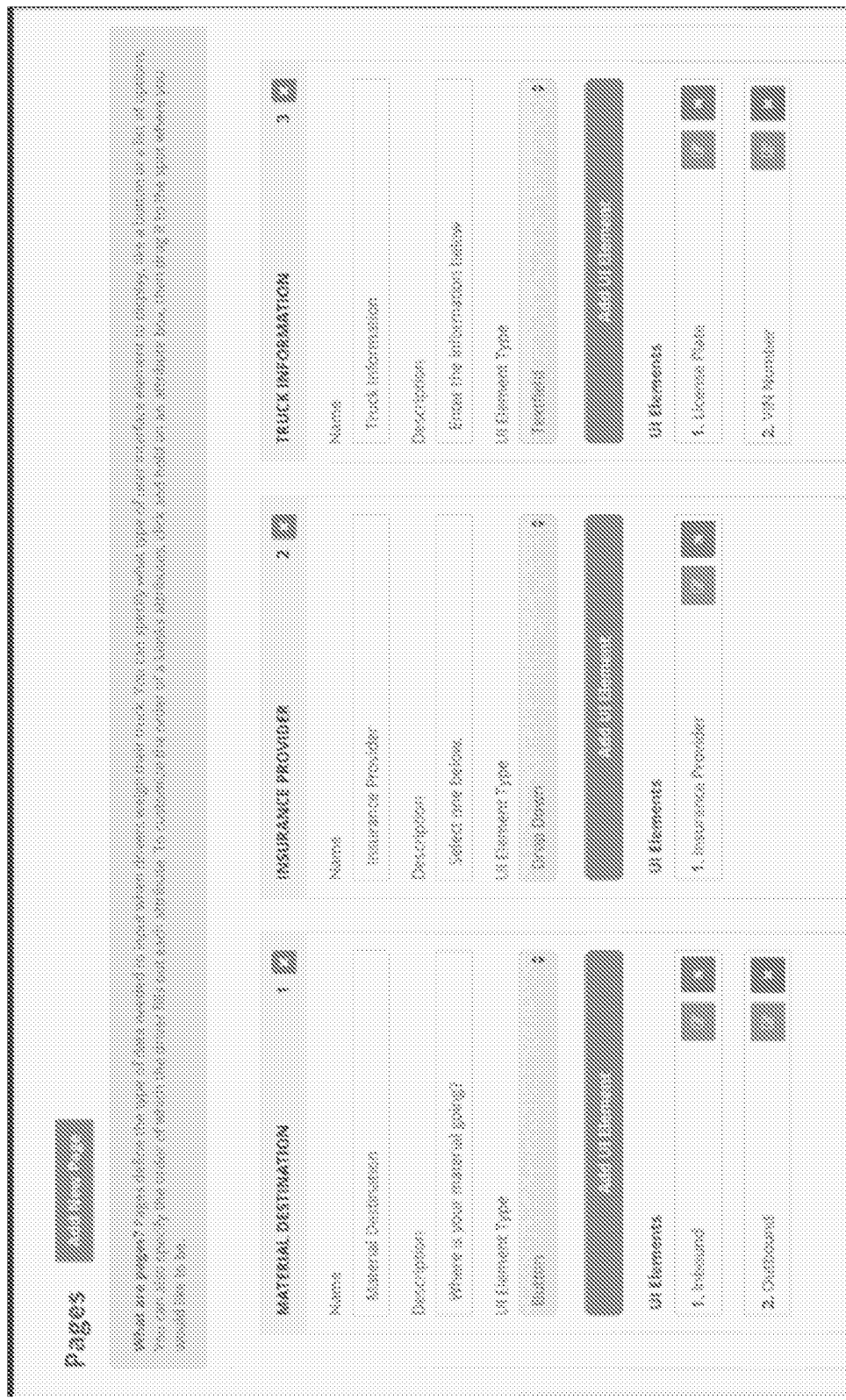
Figure 12:
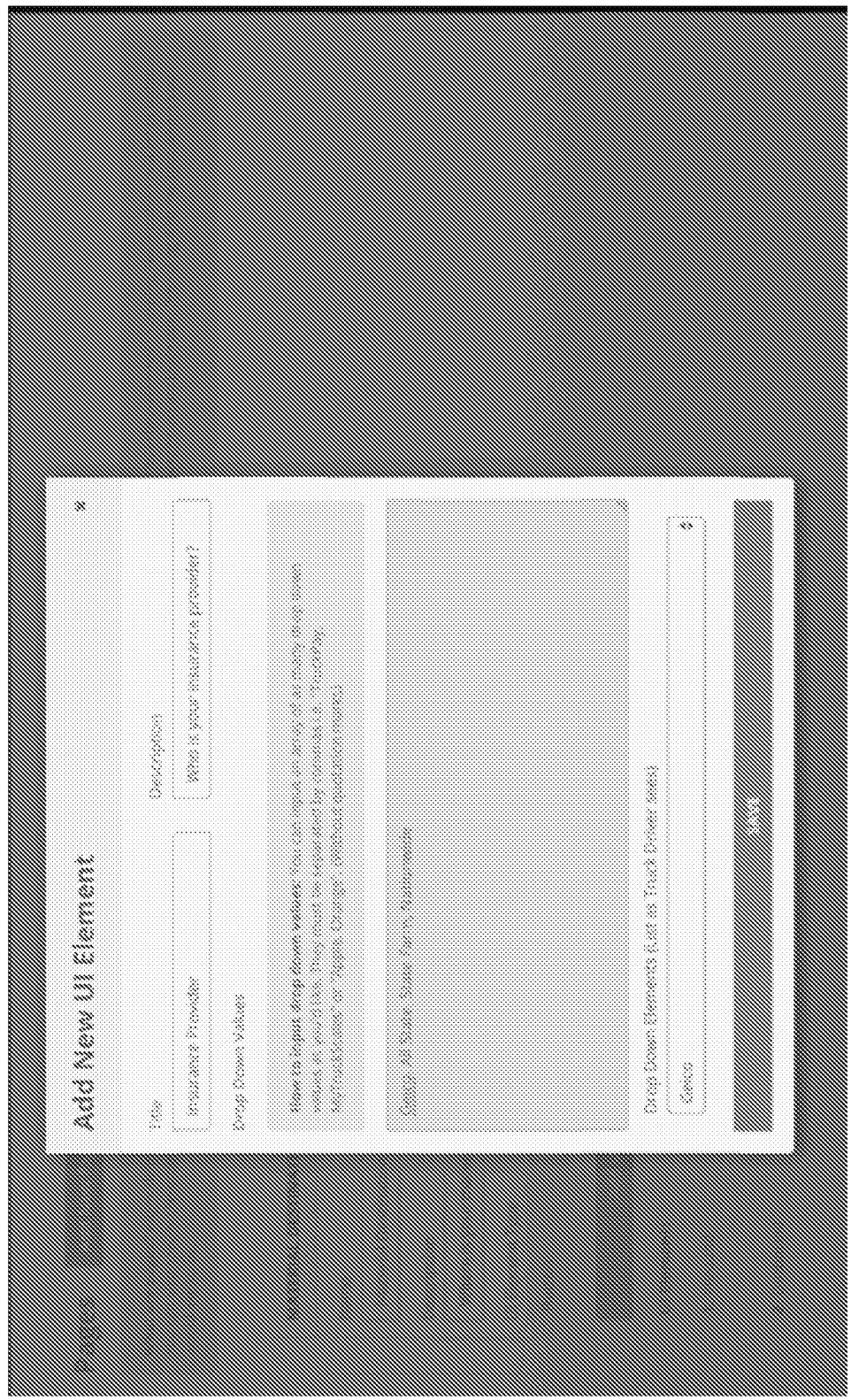

FIG. 10 presents an exemplary kiosk view of a given kiosk created for a virtual scale according to one embodiment of the present invention. The user may view and edit a given virtual kiosk and its pages. Each kiosk may include a workflow of pages that can be added and edited. A user may create pages that define the workflow for the kiosk, as illustrated in FIG. 11. Pages of a kiosk may define types of data that are solicited by the kiosk. An order of which pages presented by the kiosk may also be configured. For example, to customize the order of kiosk pages, an attribute box (e.g., "MATERIAL DESTINATION," INSURANCE PROVIDER," OR TRUCK INFORMATION") may be dragged and rearranged in a desired order. Pages may contain a title, description, a UI element type, and UI element attributes. FIG. 12 presents an exemplary interface for adding a new UI element on a given page according to one embodiment. A UI element may be used to define a predefined list of inputs that may be selected from, e.g., text-fields, buttons, and drop-down selectors.

Figure 13:
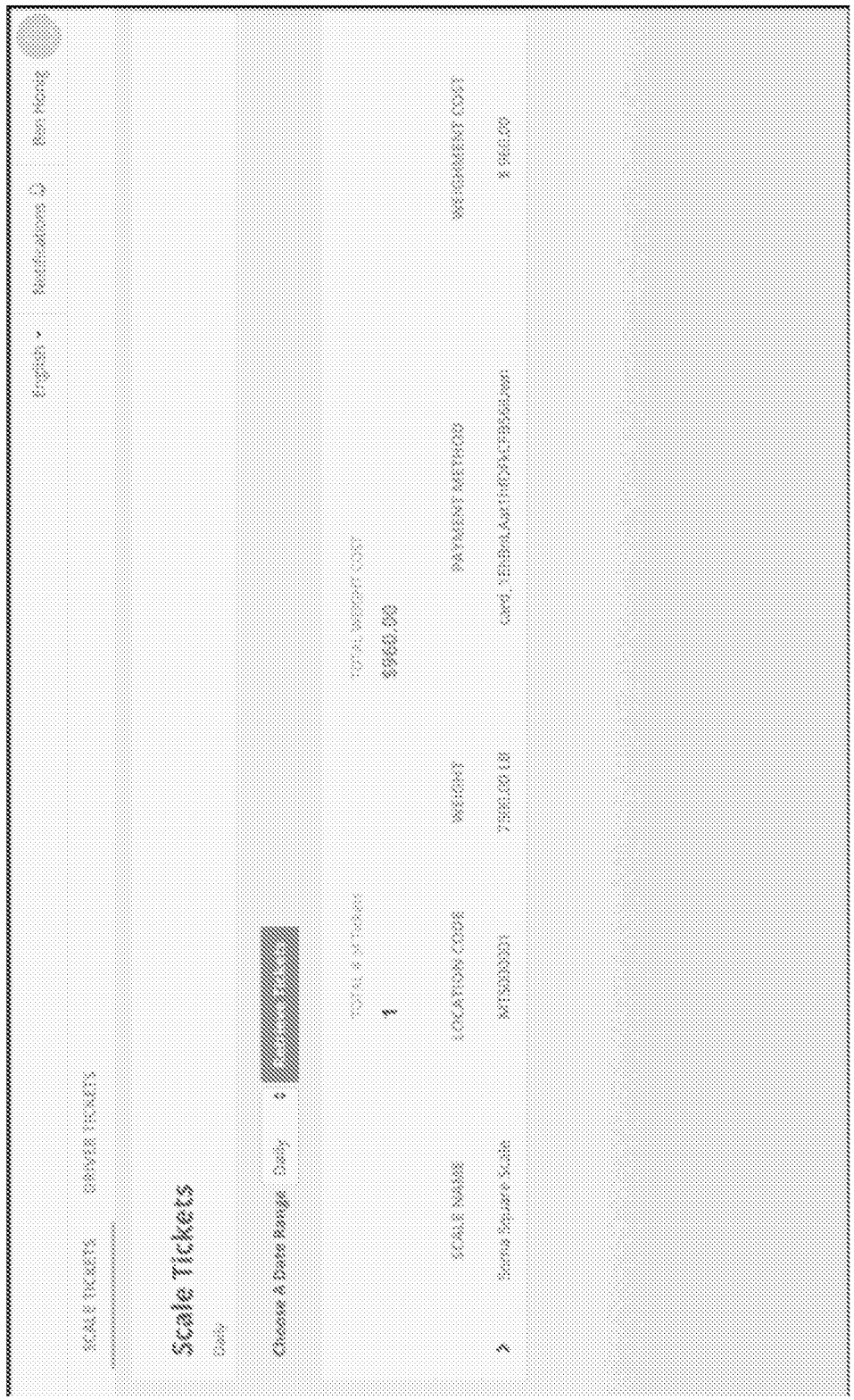

FIG. 13 presents an exemplary tickets interface according to one embodiment of the present invention. The administrative user may be able to view scale tickets and driver tickets produced by the scale management system from the operation of the kiosk and scales. Tickets may be retrieved for any period, e.g., daily, weekly, monthly, annual, etc. A ticket may include information, such as scale name, location code, weight, payment method, and weighment cost.

Figure 14:
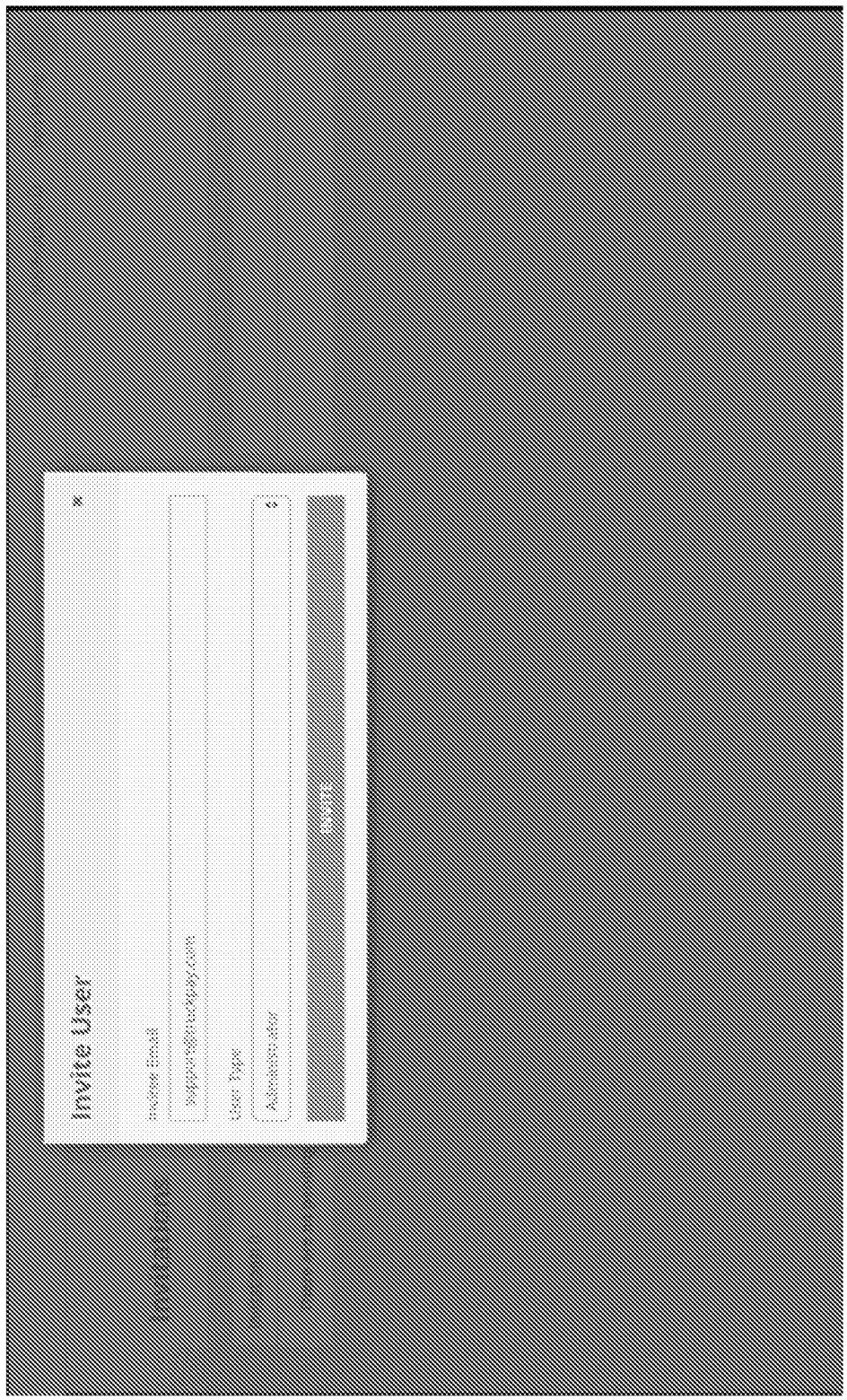

The disclose truck scale management system may be a highly secured system with role-based application entitlement. The administrator user may be allowed to create user access to truck scale management system, as illustrated in FIG. 14. Users may be invited as either a truck driver user or an administrator. The ability to create virtual scales/kiosks and authorize invoice payments may be limited to administrators, whereas truck driver users may be limited to accessing the virtual kiosk/scales to weigh their trucks.

Figure 15:
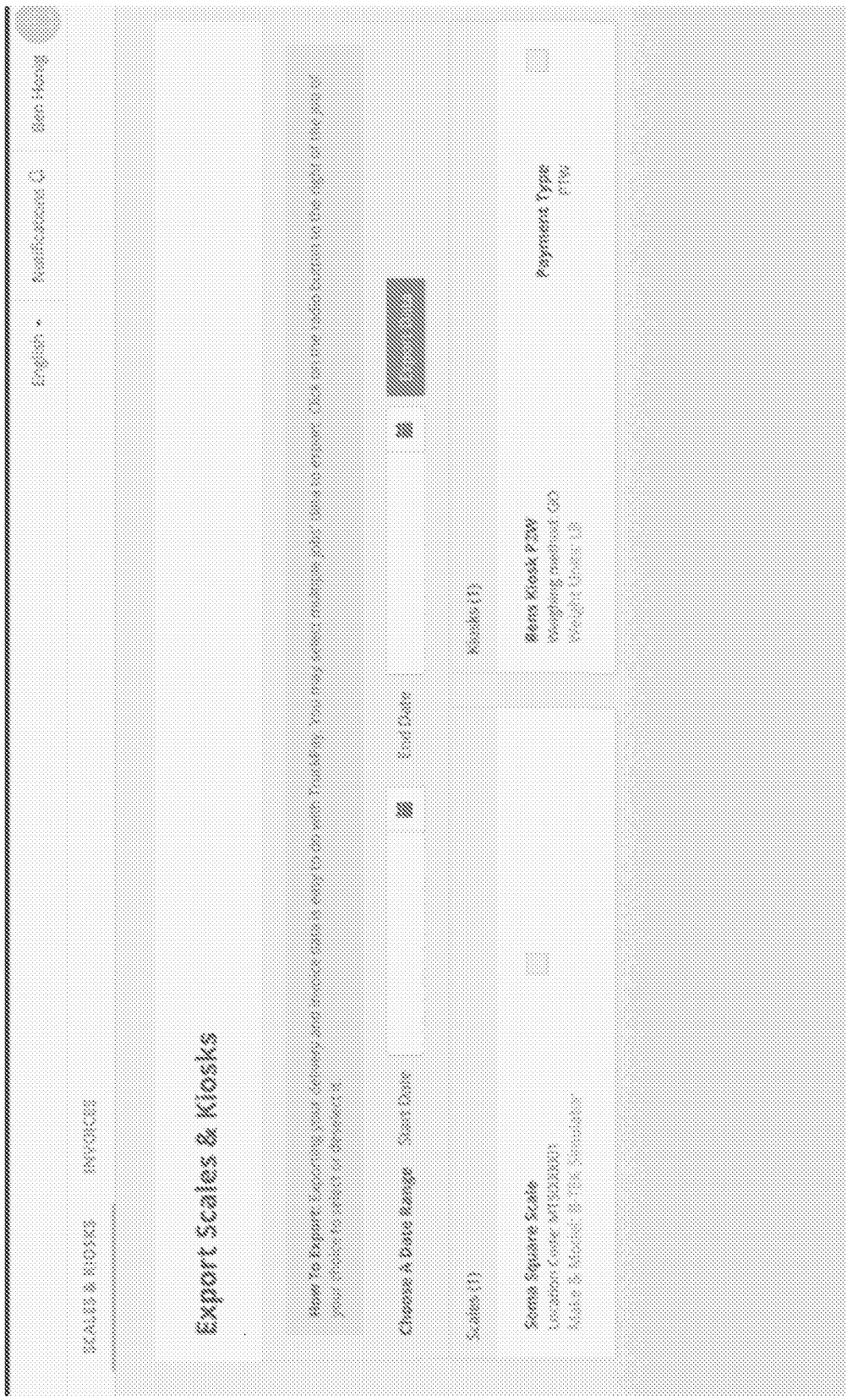

FIG. 15 presents an exemplary interface for exporting delivery and invoice data from the scales and kiosks according to an embodiment of the present invention. The interface may allow for selection of particular jobs data to export, such as from particular scales or kiosks. Scale and kiosk data may be exported in file formats, such as Portable Document Format (PDF), spreadsheet (e.g., Excel), and Comma-Separated Values (CSV).

Figure 16:
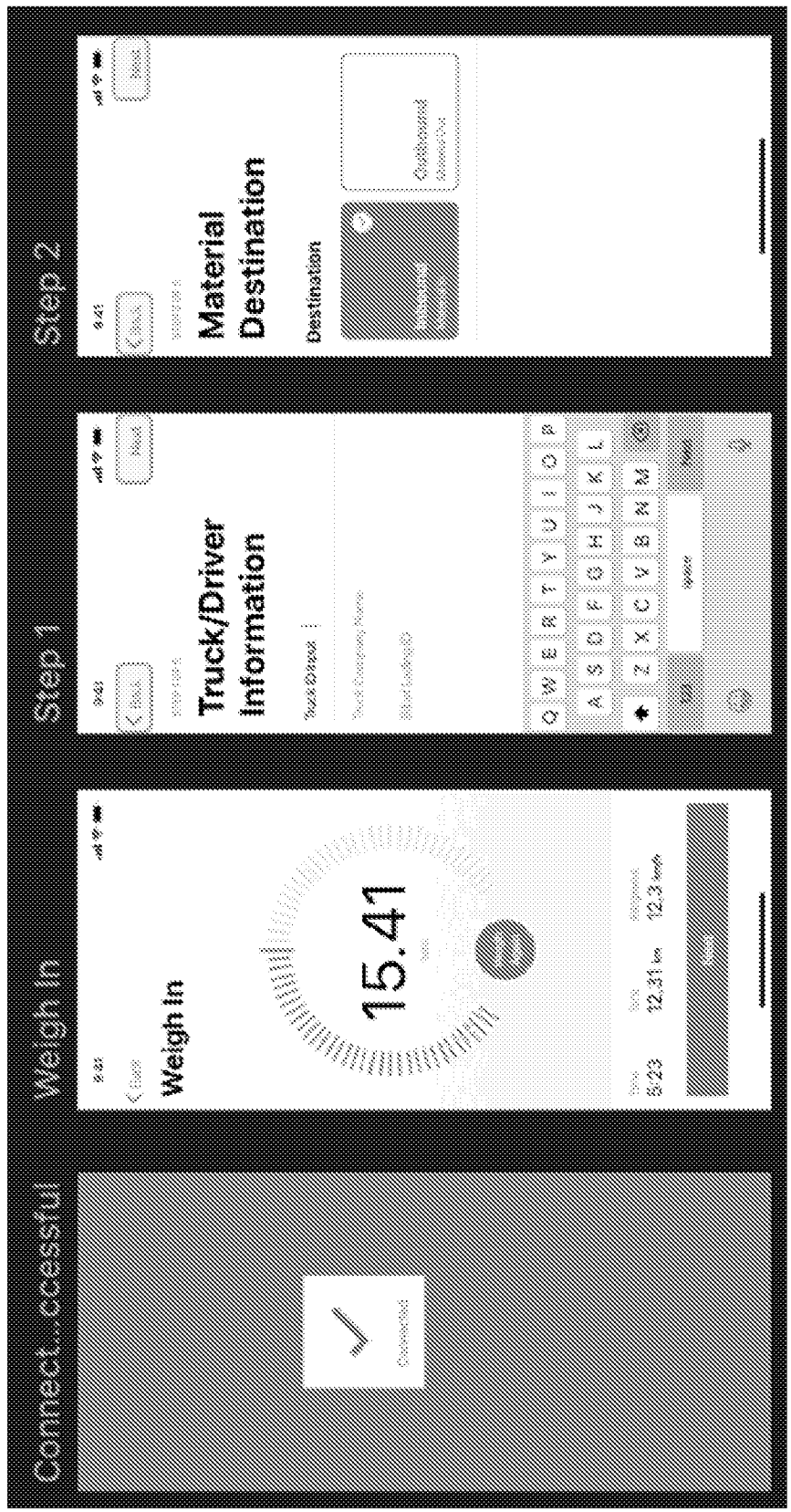
FIGS. 16-19 illustrate exemplary screen interfaces for operating a scale with a truck scale management system according to an embodiment of the present invention.
Figure 17:
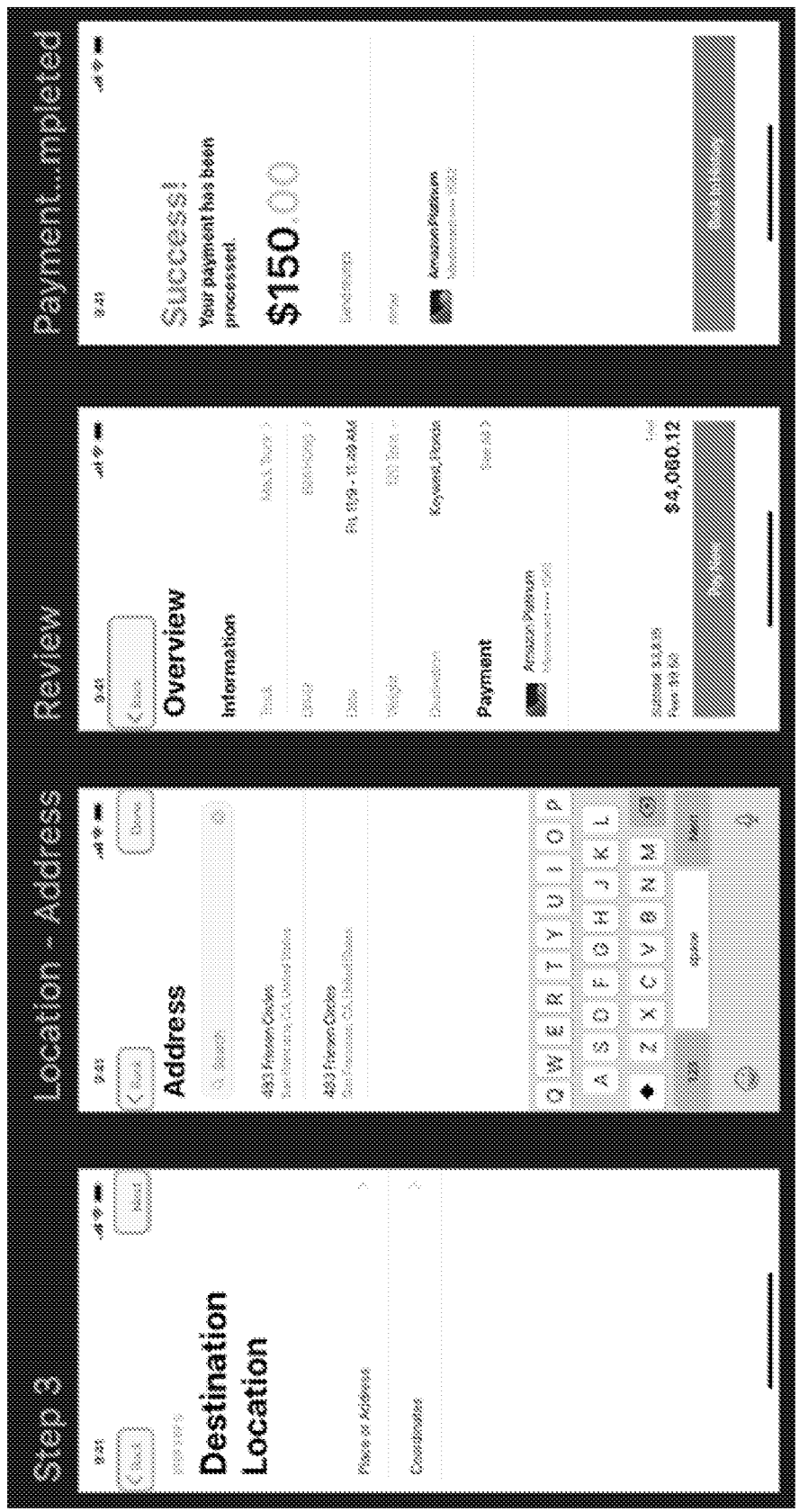

FIGS. 16 and 17 present exemplary interfaces for using accessing and utilizing a scale configured with a truck scale management system according to an embodiment of the present invention. A truck driver may pull onto a truck scale and tap a "connect to scale" button on an application executing on a mobile device to connect to a scale. The application may connect to the scale via an SSID and port number and pull a string containing axle weights of a truck including steer, drive, trailer, and gross weight ("Weigh In"). The weight is displayed on the driver's mobile device. If the driver has not turned on data location services on the mobile device, then a location code displayed at the truck site may be inputted to tell the server of the application the location. This will the mobile device to automatically connect to the scale.

Once connected to the scale, the application may download an appropriate virtual kiosk for the truck driver. The application may then build and render custom views based on the parameters from the pages defined in the virtual kiosk. The application may then guide the truck driver through the customized work flow of the virtual kiosk ("Step 1," "Step 2," "Step 3," "Location—Address," Review," and "Payment . . . mpleted.").

In one example, if weighing gross weight, the driver may be asked if the truck is already on the scale and ready for gross weigh in. Once the driver taps yes, weight may be captured and saved, along with date and time of the weighing. The driver may be prompted to confirm the weight and the fact that a gross weight was captured should be recorded. If a weighmaster is required (as configured in the virtual kiosk), then the driver may be told to call the weighmaster to complete the weighment. Additionally, in the event of weighing by TG and the current weighing is the gross weighing, a reweighment cost may be given for this ticket. Similarly, if weighing by GT and the current weighing is tare weighing, a reweighment cost may be given for this ticket.

For pay to weigh virtual kiosks, the truck driver may input credit card or company account information for automatic billing in order to pay for the weighment. A ticket may then be generated in a database. In cases where no payment is required for the use of the scale, then no payment information is requested. The virtual kiosk may allow a scale owner to have his scale used as either a credit card or an account-based pay to weigh scale or as a free scale, depending on who is using it. Different types of information and work flow may be collected and presented, depending on the truck driver who is using the kiosk.

Figure 19:
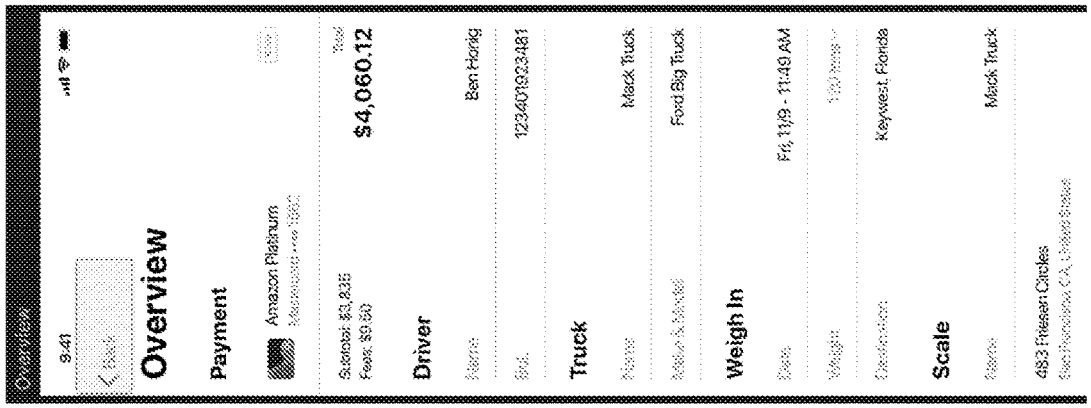
Figure 18:
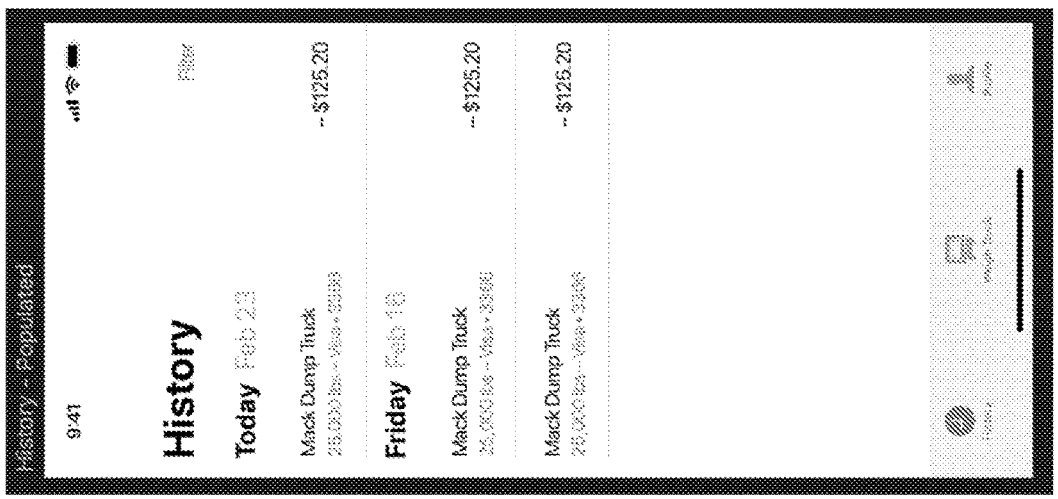

Users can view a history of all tickets generated for a particular virtual kiosk/scale (as shown in FIG. 18) and view any data associated with the virtual kiosk/scale. This includes, but is not limited to, data inputted on the virtual kiosk, exemplified in FIG. 19.

FIGS. 1 through 19 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps). In software implementations, computer software (e.g., programs or other instructions) and/or data is stored on a machine-readable medium as part of a computer program product and is loaded into a computer system or other device or machine via a removable storage drive, hard drive, or communications interface. Computer programs (also called computer control logic or computer-readable program code) are stored in a main and/or secondary memory, and executed by one or more processors (controllers, or the like) to cause the one or more processors to perform the functions of the invention as described herein. In this document, the terms "machine readable medium," "computer-readable medium," "computer program medium," and "computer usable medium" are used to generally refer to media such as a random access memory (RAM); a read only memory (ROM); a removable storage unit (e.g., a magnetic or optical disc, flash memory device, or the like); a hard disk; or the like.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. A truck scale management system comprising:
   at least one server including:
   a processor, and
   a memory having executable instructions stored thereon that when executed by the processor cause the processor to:
   connect to a truck scale system through a communication interface via at least one virtual scale associated with the truck scale system, the truck scale system comprising at least one physical truck scale and at least one other item of site machinery, the at least one virtual scale comprising a software representation of the at least one physical truck scale including first data defining how the at least one physical truck scale operates and a data connection to the at least one physical truck scale in the truck scale system, wherein the first virtual scale defines site machinery of the truck scale system to be controlled using a client device;
   retrieve, in response to a request from the client device, a virtual kiosk based on the at least one first virtual scale, the virtual kiosk associating one or more workflows with the truck scale system, the one or more workflows being editable through a truck scale management system and communicatively accessible from the client device, and the one or more workflows controlling the at least one physical truck scale and the site machinery of the truck scale system via the client device; and
   facilitate communication between the client device and the truck scale system via the virtual kiosk for controlling the at least one physical truck scale and the site machinery of the truck scale system.

2. The system of claim 1 wherein the virtual kiosk includes instructions associated with at least one of: logistics, weighing method, payments, and billing.

3. The system of claim 1 wherein the first virtual scale is associated with a plurality of virtual kiosks each comprising a different workflow defined for a given entity for display on a client device associated with the entity.

4. The system of claim 1 wherein the virtual kiosk is associated with a plurality of virtual scales each associated with a different entity and comprising a different workflow defined for a given entity.

5. The system of claim 1 wherein the processor further provides a web interface that includes functionality to create and modify the virtual scale and the virtual kiosk.

6. The system of claim 1 wherein the processor further provides access to and rendering of the virtual kiosk on the client device.

7. The system of claim 1 wherein the attributes of the physical truck scale include at least one of: make and model number, scale type, weighing capability, behavior of the scale, service set identifier, and port number.

8. The system of claim 1 wherein the processor further connects to the truck scale system via a service set identifier and a port number.

9. The system of claim 1 wherein the processor further retrieves the virtual kiosk based on a desired utilization of the truck scale system and authorization given to the client device.

10. The system of claim 1 wherein the virtual scale is associated with a company name and location.

11. The system of claim 10 wherein the processor further connects to the virtual scale based on the location associated with the virtual scale being nearest to a location of the client device.

12. The system of claim 10 wherein the processor further creates a geo-fence that specifies a distance that the client device is permitted to be away from to make a valid connection based on the location associated with the virtual scale.

13. The system of claim 1 wherein the virtual kiosk includes pages, user interface elements, and billing options that are created manually or selected from pre-created templates.

14. The system of claim 1 wherein the virtual kiosk includes pay-to-weigh and company-owned operating modes.

15. The system of claim 1 wherein the virtual kiosk includes tare-then-gross weight, gross-then-tare weight, or gross-weight only weighing methods.

16. The system of claim 1 wherein the processor further retrieves a string comprising 1) axle weights of a truck including steer, drive, trailer, and gross weight from the truck scale system in a given multi-port stream according to a user-indicated format, or 2) tare only that allows for a truck's tare weight to be stored, independent of other work flows or weighments.

17. The system of claim 1 wherein the executable instructions further cause the processor to display at least one interface screen for creating virtual kiosk pages that define workflow for virtual scales.

18. The system of claim 1 wherein the virtual kiosk includes pages, user interface elements, and billing options that are created using an application programming interface.

19. The system of claim 1 wherein the executable instructions further cause the processor to display at least one interface screen for defining a string format for a data stream transmitted by one or more physical scales.

20. The system of claim 1 wherein the virtual kiosk is associated with a plurality of virtual scales each associated with weighments in tare-then-gross or gross-then-tare work flows.

21. The system of claim 1, wherein the other item of site machinery comprises at least one sensor and wherein the first virtual scale allows control of the physical truck scale and the at least one sensor using the client device.

22. The system of claim 1, wherein the virtual kiosk comprises a plurality of pages with form elements therein for collecting information and wherein the one or more workflows includes presenting the plurality of pages, and collecting therewith and storing information relating to at least one truck being weighed in a database.

23. The system of claim 1 wherein the virtual kiosk is configured to provide discounts for reweighments where a cost for reweighment is less than an initial weighment cost within a maximum amount of time that can elapse between an initial weighment and a reweighment.

24. A method, in a data processing system comprising a processor and a memory, for managing truck scale systems, the method comprising:
   connecting to each of a plurality of truck scale systems through a communication interface via at least one virtual scale associated with a truck scale system of the plurality of the truck scale systems, the truck scale system comprising at least one physical truck scale and a plurality of other items of site machinery, a first of the at least one virtual scale comprising a data connection to the at least one physical truck scale in the truck scale system, wherein the first virtual scale includes attributes of the at least one physical truck scale and wherein the first virtual scale defines site machinery of the truck scale system to be controlled using a client device, the site machinery comprising a camera controlled by enabling via the client device scanning with the camera;

retrieving, in response to a request from the client device, a given one of a plurality of virtual kiosks that are associated with the first virtual scale from a database, the given virtual kiosk communicatively accessible from the client device and including one or more workflows that interact with the truck scale system for controlling the site machinery of the truck scale system;

causing the given virtual kiosk to be loaded onto the client device; and facilitating communication between the client device and the truck scale system via the given virtual kiosk for controlling the site machinery of the truck scale system.

25. The method of claim 24, wherein an interface screen further enables users to define the string format for a data stream transmitted over each of a plurality of ports each associated with a physical scale.

26. A truck scale management system comprising:
at least one server including:
a processor, and
a memory having executable instructions stored thereon that when executed by the processor cause the processor to:
connect to a truck scale system through a communication interface via at least one virtual scale associated with the truck scale system, the truck scale system comprising at least one physical truck scale and at least one other item of site machinery, a first of the at least one virtual scale comprising a data connection to the at least one physical truck scale in the truck scale system, wherein the first virtual scale includes attributes of the at least one physical truck scale and wherein the first virtual scale defines site machinery of the truck scale system to be controlled using a client device, the site machinery comprising a camera controlled by enabling via the client device scanning with the camera;
retrieve, in response to a request from the client device, a virtual kiosk associated with the first virtual scale, the virtual kiosk communicatively accessible from the client device and including one or more workflows that interact with the truck scale system for controlling the site machinery of the truck scale system; and
facilitate communication between the client device and the truck scale system via the virtual kiosk for controlling the site machinery of the truck scale system.

* * * * *